I. F. MANNY.
MEANS FOR SELECTIVE SIGNALING.
APPLICATION FILED OCT. 27, 1911.

1,073,863.

Patented Sept. 23, 1913.
6 SHEETS—SHEET 1.

I. F. MANNY.
MEANS FOR SELECTIVE SIGNALING.
APPLICATION FILED OCT. 27, 1911.

1,073,863.

Patented Sept. 23, 1913.
6 SHEETS—SHEET 2.

I. F. MANNY.
MEANS FOR SELECTIVE SIGNALING.
APPLICATION FILED OCT. 27, 1911.

1,073,863.

Patented Sept. 23, 1913.
6 SHEETS—SHEET 4.

I. F. MANNY.
MEANS FOR SELECTIVE SIGNALING.
APPLICATION FILED OCT. 27, 1911.

1,073,863.

Patented Sept. 23, 1913.
6 SHEETS—SHEET 5.

Witnesses:

Inventor.
Ira F. Manny.
By Morsell & Caldwell
Attorneys.

I. F. MANNY
MEANS FOR SELECTIVE SIGNALING.
APPLICATION FILED OCT. 27, 1911.

1,073,863.

Patented Sept. 23, 1913.
6 SHEETS—SHEET 6.

Witnesses.

Inventor.
Ira F. Manny.
By Morsell & Caldwell.
Attorneys.

UNITED STATES PATENT OFFICE.

IRA F. MANNY, OF MILWAUKEE, WISCONSIN, ASSIGNOR TO SELECTIVE SIGNAL COMPANY, OF MILWAUKEE, WISCONSIN, A CORPORATION OF WISCONSIN.

MEANS FOR SELECTIVE SIGNALING.

1,073,863.  Specification of Letters Patent.  Patented Sept. 23, 1913.

Application filed October 27, 1911. Serial No. 657,054.

*To all whom it may concern:*

Be it known that I, IRA F. MANNY, a citizen of the United States, and resident of Milwaukee, in the county of Milwaukee and State of Wisconsin, have invented new and useful Improvements in Means for Selective Signaling, of which the following is a description, reference being had to the accompanying drawings, which are a part of this specification.

This invention has for its object to provide means for selective signaling which will enable a signal being given at one or more of a number of sub-stations in a telephone or other system without signaling the other stations on the same circuit therewith, which means will be simple in its construction and operation, efficient and inexpensive to manufacture and maintain.

The invention relates to means for selective signaling of the type wherein a magnetically operated anchor pawl is caused to permit an escapement of a toothed disk to a greater or less degree, according to the number of selective impulses sent over the line, whereby one of the instruments is brought to a position in which it makes a connection for producing a signal, either by means of a signaling impulse over the line, or otherwise, said anchor pawl being then automatically released from the toothed disk permitting it to turn, it being one object of this invention to simplify and improve upon the mechanism for causing the anchor pawl to release the toothed disk.

Another object of the invention is to permit of the signal being given at any number of sub-stations on the circuit which may be desired to be signaled at one time.

Another object of the invention is to provide each sub-station with means for signaling and talking with central except when the line is already in use, the talking circuit of the sub-station at such time being locked out of the line circuit.

Another object of the invention is to provide means of novel construction for automatically rewinding the motor which turns the escapement disk.

Another object of the invention is to perfect details of construction of mechanism of this character.

With the above and other objects in view, the invention consists in means for selective signaling, as herein claimed, and all equivalents.

Referring to the accompanying drawings exemplifying the invention by illustrating one embodiment thereof, and in which like characters of reference indicate the same parts in the different views.

Figure 11:
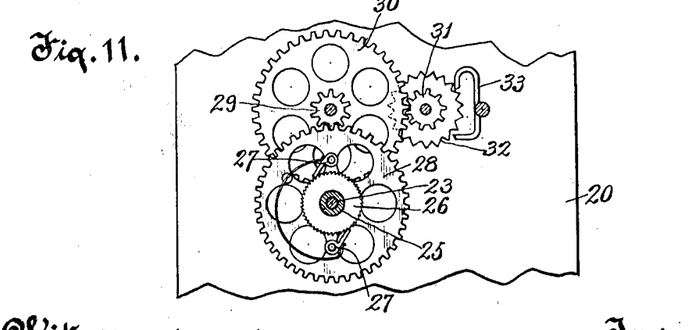
Fig. 11 is a view looking at the back of the front plate showing the speed retarding ratchet mechanism removed from the instrument as shown in Fig. 10.
Figure 12:
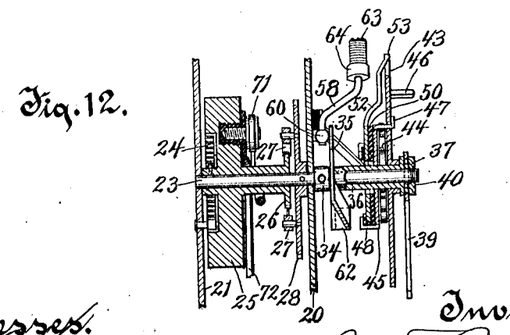
Fig. 12 is a detail sectional view showing the motor shaft and the parts mounted thereon.
Figure 13:
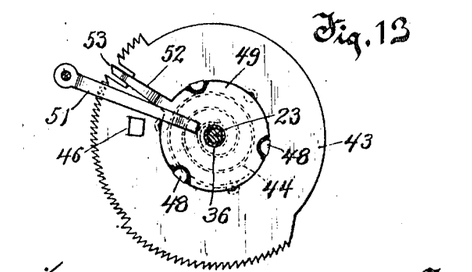
Fig. 13 is a rear view of the toothed disk, showing the insulated mounting of the signaling tooth thereof.

In these drawings the instrument is shown built upon a frame comprising a front plate 20 and a back plate 21 connected by spacing posts 22, as common with ordinary clock-work mechanism. A motor shaft 23 is journaled through the front and back plates of the frame and extends beyond the front plate to a considerable extent, as shown in Fig. 12. This motor shaft is given a tendency to turn by means of a coil spring 24 which is contained within a balance wheel 25. The balance wheel is loosely mounted on the shaft, but carries a ratchet wheel 26 engaged by spring pressed dogs 27 on a gear wheel 28 which is fixed on the motor shaft. The pressure of the spring 24, which has its outer end anchored on the frame and its inner end connected with the balance wheel, is imparted to the motor shaft through such ratchet connection, which is best seen in Fig. 11. As also seen in Fig. 11, the motion of the motor shaft, besides being controlled by mechanism to be later described, is retarded by a star wheel escapement which comprises a pinion 29 meshing with the gear wheel 28 and carrying gear wheel 30 which meshes with a pinion 31, carrying a star wheel 32 engaged by an escapement pawl 33 in the well known manner.

Figure 4:
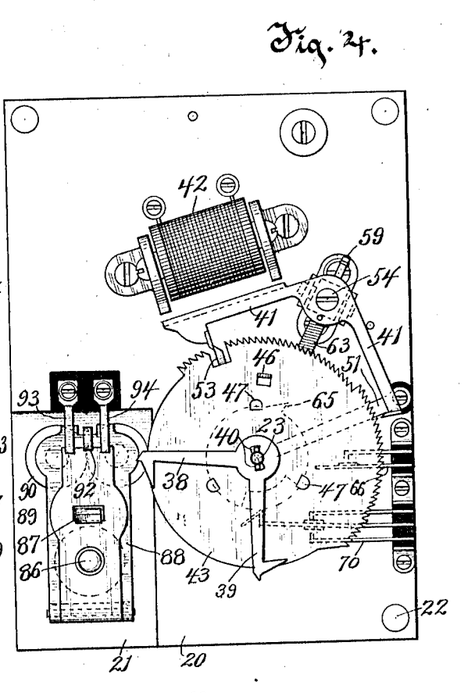
Fig. 4 is a front view thereof with the parts in a position assumed by them during the sending of selective impulses.
Figure 5:
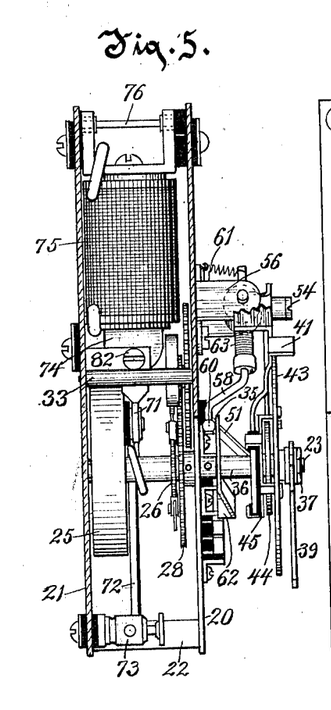
Fig. 5 is a sectional side elevation of the mechanism with the parts in this position.

On the projecting front end of the motor shaft, as best seen in Fig. 12, there is first a shoulder 34 fixed in place thereon and having a cam disk 35 held tightly against it by means of a sleeve 36 surrounding the shaft and engaged by a nut 37 threaded on the end of the shaft. A starting arm 38 and a locking arm 39, at an angle to each other and preferably formed of a single piece of metal, as shown, are mounted on the front end of the motor shaft and are keyed thereto with a certain amount of play, having a pin 40 through the front end of the shaft enter larger recesses of said arms, the nut 37 having been removed in Fig. 4 to show this relation of the parts. These arms 38 and 39 are adapted to be engaged by a spring retracted anchor pawl 41, which is pivotally mounted on the front plate of the frame in a manner to be later described in detail, and which constitutes the armature for an electric magnet 42, whereby it may be swung out of engagement with the arms to release them and permit the motor to run.

A toothed disk 43, having its periphery toothed at different distances from the center and engaged by the respective ends of the anchor pawl 41, is loosely mounted on the sleeve 36,—(see Fig. 12) though it has a yielding spring connection therewith. This connection comprises a light coil spring 44 with its inner end secured to the sleeve 36 and its outer end secured to a spring cage 45 which is mounted on the back of the disk 43 and incloses said spring 44. Thus, when the motor shaft is released its turning movements tend to turn the toothed disk, but the toothed disk may be detained by its engagement with the anchor pawl, the turning of the motor shaft meanwhile serving to tighten the spring 44, so that when the toothed disk is released it will follow the movements of the motor shaft until a stop lug 46 thereon engages the starting arm 38.

The spring cage 45 is desirably formed of a disk of sheet metal with projecting arms 47 bent forwardly and passing through openings in the disk where they are then bent over, while other arms 48 bend rearwardly and into notches in the edges of a contact disk 49 which is back of the spring cage and is insulated therefrom by having a sheet of insulating material 50 between them. The sheet of insulating material in practice is a thin fiber sheet which is stamped in disk form with projections or tabs at its edges to fit beneath the arms 48 of the spring cage as they bend around the edge of the contact disk. The insulating disk is placed between the disk of the spring cage and the contact disk and its projecting tabs are bent around the edges of the contact disk within the notches thereof by the operation of the forming dies which bend the arms 48, thus locking these parts firmly together while at the same time keeping them insulated from each other.

The contact disk is engaged by a spring brush 51 mounted on and insulated from the front plate 20 and a contact arm 52 projecting from the contact disk is bent to lie within a recess in the toothed portion of the disk 43, forming a contact tooth 53 to take the place of one of the teeth of the first series of teeth which corresponds to the number of the instrument. The instrument shown in the drawings is No. 5 and the contact tooth 53 is the fifth escapement tooth in the series, the first tooth being not considered as it is normally engaged by the anchor pawl in all instruments.

Figure 9:
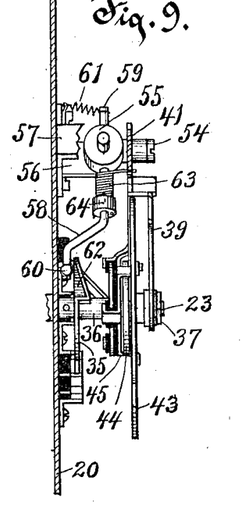
Fig. 9 is a sectional side view showing parts in this position.

The anchor pawl 41 is pivotally mounted on a screw stud 54 which is carried by a block 55 (Figs. 2 and 9) in turn pivotally mounted on trunnions in upturned ears 56 of a base 57 secured to the front plate 20. Thus besides the locking movements of the anchor pawl to permit of the escapement of the toothed disk and the release of the starting and locking arms, it is capable of a swinging movement on an axis at approximately right angles to the axis of its rocking movement which carries it nearer to or farther from the front plate so as to clear the plane of the toothed disk and the starting and locking arms.

Figure 1:
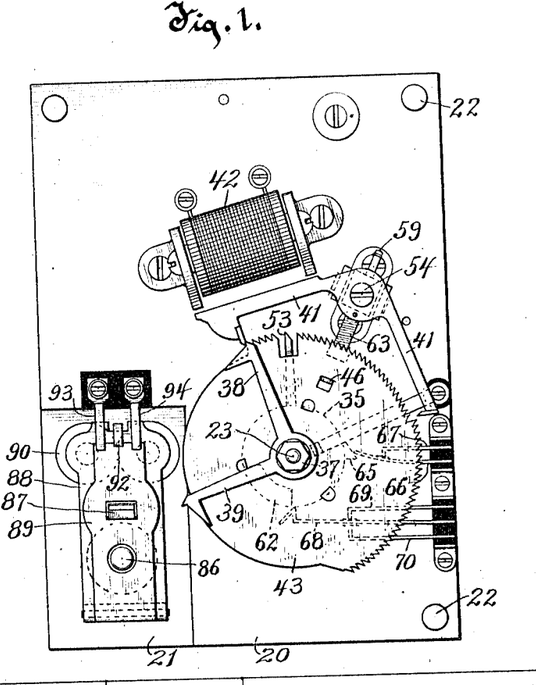
Figure 1 is a front view of an instrument constituting a means for selective signaling and constructed in accordance with this invention, the parts being shown in their normal positions.
Figure 2:
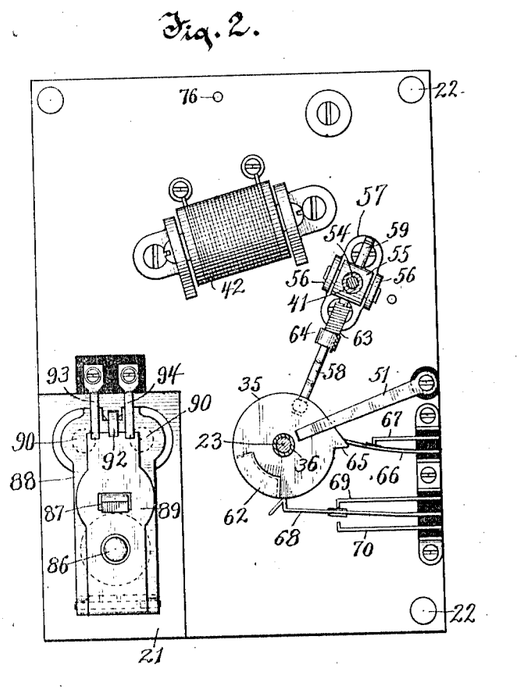
Fig. 2 is a similar view with the disk and anchor pawl removed.
Figure 6:
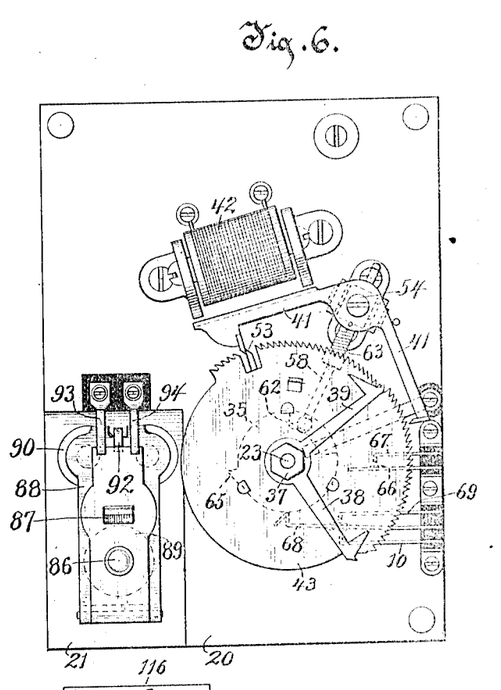
Fig. 6 is a front view of the instrument with the parts in the signaling position, the anchor pawl being in the act of releasing the toothed disk.
Figure 7:
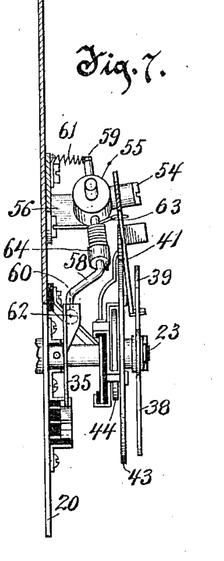
Fig. 7 is a sectional side view showing parts in this position.
Figure 8:
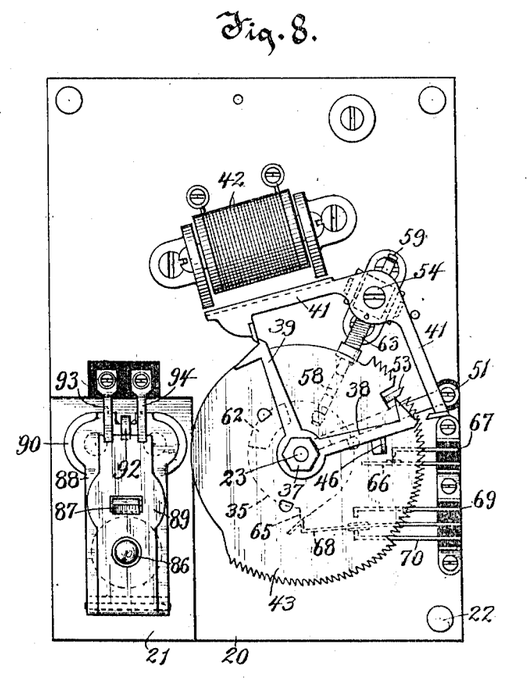
Fig. 8 is a front view of the instrument showing parts in the talking or signaling position.

In addition to the anchor pawl, the pivoted block 55 carries a downwardly extending arm 58 and an upwardly extending arm 59, the former having a ball-shaped roller 60 on its bent lower end which bears against the rear face of cam disk 35 and is held firmly in contact therewith by means of a coil spring 61 connecting the arm 59 with the base 57. The cam disk 35 is provided with a recess or cam portion 62 into which the arm 58 springs when the motor shaft has turned to the position of the parts shown in Fig. 6, so as to swing the anchor pawl 41 out of engagement with the toothed disk 43, as shown in Fig. 7, the further movements of the motor shaft restoring the anchor pawl to its normal plane by the cam action of the inclined wall of cam recess 62 on the arm 58. A torsional spring 63 surrounds the arm 58, with one end engaged by an adjusting collar 64 on said arm and the other end engaging the anchor pawl 41 to return said anchor pawl to its normal engagement with the toothed disk as soon as its operating magnet 42 is deënergized. The cam disk 35 is also provided with a tooth 65, which in the normal position of the parts, as shown in Fig. 2, engages a spring tongue 66 and holds it in contact with a switch contact 67, there being another spring tongue 68 in the path of movement of the tooth 65 which normally engages a switch contact 69, but which may be forced by the engagement of said tooth 65 therewith out of contact with switch contact 69 and into contact with another switch contact 70, on the other side thereof, this being the position of the parts when the instrument is held stationary by the engagement of the locking arm 39 with anchor pawl 41 during the talking connection, as shown in Fig. 8.

Figure 10:
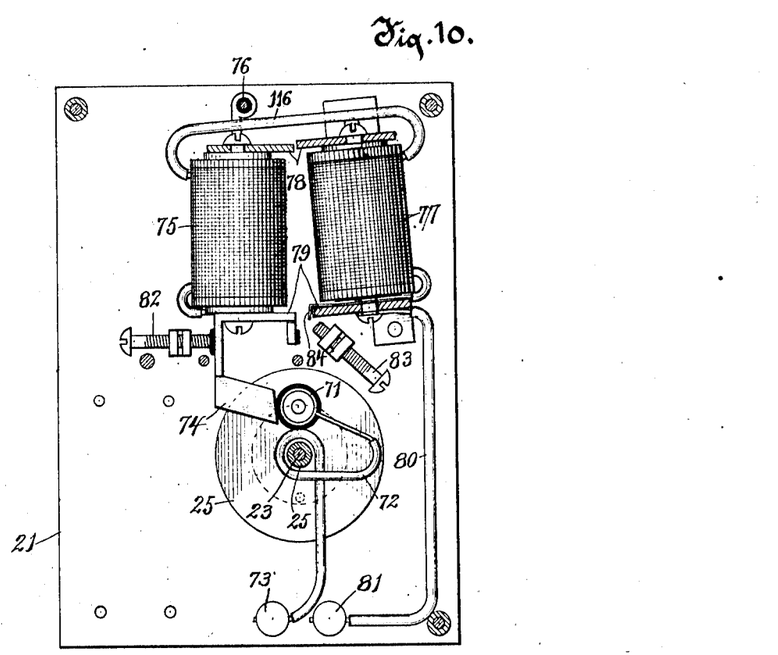
Fig. 10 is a front view of the instrument with the front plate removed and parts sectioned to show the rewinding mechanism for the motor.

The balance wheel 25 carries a roller 71, see Figs. 10 and 12, which is insulated therefrom, but which has a flexible wire connection 72 with a binding post 73 on the back plate 21 of the frame and said roller 71 constitutes a switch contact which closes an electrical circuit by coming into engagement with a contact 74 carried by a swinging magnet member 75 which is pivotally suspended upon, though insulated from a pin 76 extending across the frame at its upper end. Said swinging magnet member 75 has a companion stationary member 77 mounted on the back plate 21, the magnet members being complementary to each other, each closing its magnetic circuit through the core of the other, and being provided with inner core pieces 78 and outer core pieces 79 for this purpose. Each magnet member has one end of its winding connected with its core piece 79, the other ends being connected together, while a wire 80 connects the terminal of magnet member 77 with a binding post 81 on the back plate of the frame. A set screw 82 limits the outward movement of magnet member 75 by engaging the contact 74 thereof, while a set screw 83 limits the inward movement thereof in a like manner, there being insulation on the contact 74 at these points of engagement with the set screws.

The circuit closed by the engagement of the contact roller 71 and the contact 74 includes the rewinding magnet consisting of magnet members 75 and 77, so that said magnet thereupon becomes energized, swinging the contact 74 and by its engagement with the roller turning the balance wheel. The momentum of the balance wheel causes it to continue its turning movement beyond the point at which the contact 74 is stopped by set screw 83, thus breaking the circuit and permitting the weight of the swinging member to return it to its normal position. The turning movement of the balance wheel 25 is permitted by the escapement of the teeth of the ratchet 26 beneath the dogs 27 and serves to tighten or rewind the motor spring 24 to a certain extent and this rewinding operation will take place whenever the motor is so far run down as to swing the roller 71 into engagement with the contact 74. A contact spring 84 is preferably mounted on the core piece 79 of magnet member 77 and is adapted to be engaged by the contact 74 when it completes its inward movement, thus short circuiting the rewinding magnet so that the circuit broken by the roller 71 leaving contact 74 will not include the magnet winding and arcing at the contacts will be avoided.

Figure 3:
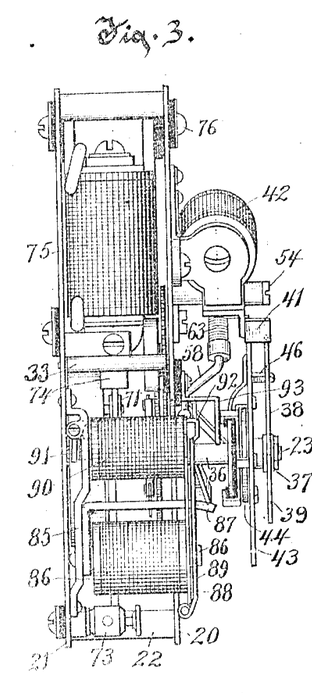
Fig. 3 is a side elevation with the parts in the same position.
Figure 14:
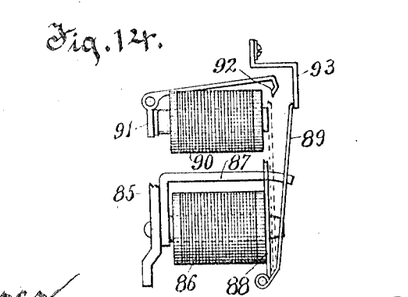
Fig. 14 is a detail view of the automatic drop mechanism.

The front plate 20 of the frame is shown to have one corner thereof cut away to accommodate an automatic drop mechanism, (best shown in Figs. 2 and 3) and this drop mechanism comprises a frame 85 secured to the back plate of the main frame of the instrument with a resetting magnet coil 86 thereon having a return pole piece 87 extending through an opening in a front plate 88 on the front end of the magnet core and also through an opening in an armature plate 89 which is pivotally mounted at its lower end to said front plate. The magnet core is rounded on its end and also projects through openings in the front plate 88 and the armature plate 89. A pair of releasing magnet coils 90 are mounted on the frame 85 and attract a bell crank armature 91 which is pivoted on the frame 85 and extends forwardly to form a hook 92 for engaging the upper end of the armature plate 89 to normally hold it in its upright position. When the releasing magnets 19 are energized, they attract their armature 91 and lift the hook 92 so that the armature plate 89 is free to drop, as shown in Fig. 14, until it engages with a pair of spring contacts 93 and 94 which are mounted on and insulated from the front plate 20 of the instrument. When the resetting magnet 86 is energized, it serves to restore the armature plate 89 to its upright position, forcing it beneath the cam end of hook 92 to be reëngaged thereby and held in its upright position until the magnet 90 is again energized.

Figure 15:
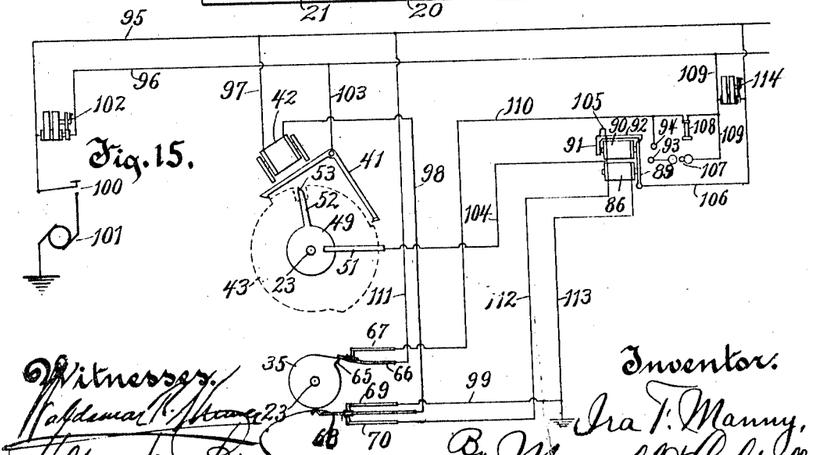
Fig. 15 is a diagram of circuit connections of one of the instruments with the central station.

The wiring of the instrument, which is shown in Fig. 15 in diagram, is as follows: The line wires 95 and 96 connect the central station with the subscriber's station and at each subscriber's station a wire 97 connects the line wire 95 with the magnet 42 and a wire 98 connects the other end of the magnet winding to the switch tongue 68 while a wire 99 connects the switch contact 69 with the ground. Hence, an impulse sent from the central station over the line wire 95, as by closing a switch 100 to connect a grounded generator 101 to said line wire, will pass through the magnet 42, by way of the wires 97 and 98, the closed switch contacts 67 and 68 and the wires 99 to the ground. This impulse energizes magnet 42 and causes it to swing the anchor pawl 41. A number of these impulses is sent from the central station, corresponding to the number of the sub-station desired to be signaled, and for each impulse the instruments at all sub-stations on that circuit have their toothed disks advanced one tooth, the motor shafts having been released and set in operation upon the first impulse, when the starting arms 38 were released by the anchor pawl.

After the motor shaft has been in operation a sufficient length of time to enable the operator at central to give the maximum number of impulses for which the instrument is adapted, the cam disk 35 brings its recessed portion 62 into position to receive the end of arm 58, whereupon the spring 61 causes the anchor pawl 41 to swing out of the plane of the toothed disk, releasing the same and permitting it to turn under the action of spring 44 until the stop lug 46 engages the starting arm 38. Soon after completing the sending of the desired number of selecting impulses, the operator at central station sends a ringing current over the line wires as by turning a magneto 102, connecting the line wires. At the sub-station corresponding in number to the number of selective impulses sent, the contact tooth 53 will then be in engagement with the anchor pawl 41 and consequently at that instrument this ringing circuit is effective by passing over line wire 96 through a wire 103 connecting it with the anchor pawl 41, through said contact tooth 53 of the disk 49 and the brush 51 bearing thereon, then through a wire 104 leading from said brush to one end of the winding of the drop magnet 90 and through the armature hook 92 of said drop magnet which is connected by a wire 105 to the other end of the winding thereof, to the armature plate 89 and then by a way of a wire 106 which connects therewith to the other line wire 95. The magnet 90 being energized by this ringing impulse releases the armature plate 89 and permits it to fall into contact with the spring contacts 93 and 94 respectively. The armature plate 89 upon being disengaged from the armature hook 92 opens the circuit through the magnet 90, but its engagement with the spring contacts 93 and 94 serves to connect a bell 107 and the telephone instrument 108 across the line wires, so that the continuation of such ringing impulse or succeeding impulse will cause the bell 107 of the instrument to ring. The circuit through the bell may be traced from line wire 95 to wire 106 to the armature plate 89 in engagement with the contact 93 and then through the bell 107 which is connected between the contact 93 and the line wire 96 by means of a wire 109. The telephone instrument 108 is likewise included in the circuit thus established by the fall of the automatic drop since it is connected between the wire 109 and the contact 94 by means of a wire 110. The wire 110 also connects with the spring contact 67 normally engaged by the spring tongue 66 which is connected by a wire 111 with the line wire 95 in order that said telephone instrument 108 may be normally connected across the line to permit of the sub-station calling and communicating with central when the line is not in use. However, when the drop is operated, the cam tooth 65 which normally holds the switch contacts 66 and 67 in engagement is out of position to produce this effect and at the time that all of the instruments are brought to a stop by the engagement of their locking arms 39 with the anchor pawl, which has now been returned to its normal position, all of the instruments except that one which was signaled have their telephone instruments cut out of circuit by the opening of their switch contacts 66 and 67 and the signaled instrument has its telephone set included in the talking circuit by the engagement of the armature plate 89 with the contact 94 as described.

When the conversation is ended, as indicated at the central station in any usual manner, the operator at central station sends another impulse over the line by closing switch 100 and thus energizes the magnets 42 of all instruments, causing the anchor pawl 41 to release the locking arms 39 and permit the motors to turn until the starting arms 38 are engaged. This clearing impulse to restore all instruments on the line to their normal positions, however, is made with the instruments in their talking position, as shown in Fig. 8, and at such time the spring tongue 68 instead of being in engagement with the spring contact 69 is held by the cam tooth 65 in engagement with the spring contact 70 which is connected by a wire 112 with one end of the winding of resetting magnet 86, the other end thereof being connected by a wire 113 with the ground. Thus, the automatic drop of the sub-station signaled is reset by the clearing impulse. Each sub-station is provided with a magneto 114 or other signaling means connected across the line wires preferably between wires 106 and 109 and by means thereof the central station may be signaled.

Figure 16:
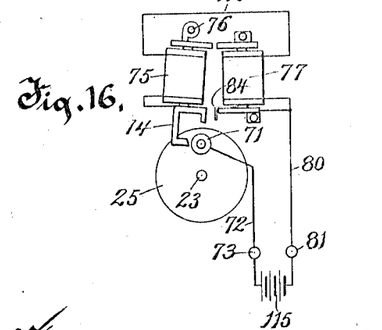
Fig. 16 is a diagram of circuit connections of the motor rewinding mechanism.

The wiring of the rewinding mechanism, as shown in Fig. 16, is such that the magnets 75 and 77 are energized by the engagement of roller 71 with the contact 74, and are deënergized by said contact 74 engaging the spring contact 84 for short circuiting the magnets. As here shown, a battery 115 or other source of current supply is connected between the binding posts 73 and 81, so that when the roller 71 contacts with the contact 74, the circuit may be traced from said battery to binding post 73 and wire 72 to the roller 71 and the engaged contact 74, then through the winding of magnet 75 and the wire 116 which connects the two magnet windings and through the winding of magnet 77 and by way of wire 80 to binding post 81 to the battery. When the magnets 75 and 77 are energized, the movement produced thereby first causes them to be short circuited and then as the roller 71 leaves the contact 74, the circuit is broken, but the short circuiting of the magnets before breaking the circuits avoids the forming of an arc at the contact roller.

It will be noted that if it is desired to connect more than one instrument on the line at one time, it is only necessary for the operator at the central station to give the number of impulses corresponding with the lowest number desired and then send a signaling impulse to signal that station, and then follow immediately after with a number of additional selective impulses to make the total number of selective impulses equal to the next higher number desired and then send another signaling impulse and so on indefinitely, except that all signaling impulses must be made before the instruments have advanced sufficiently to have their anchor pawls disengaged from the toothed disk.

By means of this invention the construction is simplified, reducing the cost of manufacture and insuring durability. The formation of the spring cage 45 in particular possesses advantages in its simplicity for the purposes intended, being formed from a single piece of sheet metal with certain of its projecting tongues engaging and locking with the toothed disk to form an inclosure for the spring 44 and others of said tongues securely holding in its insulated position the contact disk 49 carrying the contact tooth 53, thus affording a means for rigidly mounting the insulated though electrically connected contact tooth on the toothed disk, a feature of great importance in a device of this character.

Another feature of construction possessing particular merit is the means employed in this invention for disengaging the anchor pawl from the toothed disk, comprising the mounting of the anchor pawl whereby it may swing laterally for such disengagement as well as rock as usual for its escapement. The cam disk on the motor shaft engaging the arm of the spring actuated mounting for the anchor pawl constitutes a means of extreme simplicity and durability and effectiveness for producing the disengagement of the anchor pawl from the toothed disk at a desired point in the cycle of operation of the device.

Another notable feature of construction of this invention is the motor spring rewinding mechanism which automatically rewinds the motor spring as soon as it has run down to a certain extent, thus requiring of the motor spring a minimum amount of work to be performed at each winding and permitting the use of a light and inexpensive spring that may be incased within the balance wheel for convenience and for economy of space.

Another novel feature of construction comprises the switch mechanism operated by the cam disk in the different positions of the motor shaft and the automatic drop having circuit connections therewith and together constituting a means for controlling the operation of the signal connections for the subscribers' stations and for locking out the subscribers' instruments when the line is in use.

It is to be understood that by means of this invention the subscriber's station which has had its number called by the selective impulse may be signaled, not only by the signaling impulse which serves to throw the automatic drop thereof, but in event of the subscriber not promptly answering the call, it is only necessary for the operator at central station to send further signaling impulses over the line and these will be effective for ringing the subscriber's bell, the parts remaining in their same positions from the time that the instrument is locked by the engagement of the locking arm 39 with the anchor pawl, and the succeeding fall of the automatic drop, throughout the talking connection and until the clearing impulse is sent over the line from the central station to restore all instruments to their normal positions.

It will be seen that the position of the starting arm and locking arm will indicate the condition of the line, that is to say, when the starting arm is engaged by the anchor pawl, the line is not in use, and when the locking arm is engaged by the anchor pawl, the line is in use, so that the subscriber may be informed before trying to call central whether the line is in use.

The object of providing starting and locking arms with a limited play or freedom of movement on the motor shaft is to avoid the possibility of the escapement of the toothed disk being retarded by the comparatively slow action of the motor when the series of selective impulses is sent rapidly, as by mechanical means. As soon as the locking arm is released by the anchor pawl, it drops the distance permitted by its play or loose movement on the motor shaft and thus takes a lead of the motor shaft which will enable the toothed disk to be immediately advanced the full distance of the arc of its escapement teeth without the stop 46 engaging the starting arm to retard the escapement of the toothed disk.

The particular construction of the armature plate for the automatic drop and the core piece 87 of its resetting magnet is such that it is found to possess effective attractive power throughout the arc of movement of the armature plate.

I desire it to be understood that this invention is not limited to any specific form or arrangement of parts except in so far as such limitations are specified in the claims.

What I claim as new and desire to secure by Letters Patent, is:

1. Means for selective signaling, comprising a motor actuated toothed rotary member, an escapement means therefor comprising a suitably operated anchor pawl for engaging the teeth of the rotary member, a swinging mounting on which the anchor pawl is pivotally supported, a suitably driven cam engaged by said mounting for causing it to swing to remove the anchor pawl from engagement with the toothed member, and a signaling circuit connection closed by the rotary member in one position thereof.

2. Means for selective signaling, comprising a motor driven toothed rotary member, a magnetically operated anchor pawl for producing escapement of the rotary member, a pivoted block on which the anchor pawl is pivotally mounted, an arm projecting from the pivoted block, a motor driven cam engaged by the arm for turning the block to remove the anchor pawl from engagement with the rotary member, and a signaling circuit connection closed by the rotary member in one position thereof.

3. Means for selective signaling, comprising a motor driven cam, a pivoted block having an arm engaged by the cam for causing it to swing, a suitably operated escapement pawl pivotally mounted on the block, a motor driven rotary toothed member engaged by the escapement pawl in one position of the block, the movements of the block produced by the engagement of the cam with the arm serving to remove the escapement pawl from engagement with the toothed member and a signaling circuit connection closed by the rotary member in one position thereof.

4. Means for selective signaling, comprising a motor driven rotary toothed member, a motor driven cam, a sheet metal base plate having ears bent up therefrom, a block pivotally mounted between the ears, a spring connecting the block with the base plate, an arm carried by the block bearing on the cam to be moved thereby against the action of the spring, an anchor pawl pivotally mounted on the block, a spring surrounding the arm and engaging the anchor pawl, a magnet attracting the anchor pawl and causing it to swing against the action of its spring, said anchor pawl in one position of the block engaging with the teeth of the rotary member to provide an escapement therefor and in another position of the block being removed from engagement with the rotary member, and a signaling circuit connection closed by the rotary member in one position thereof.

5. Means for selective signaling, comprising a motor driven shaft, a disk thereon having a cam depression in one face thereof, a spring actuated pivoted block, an arm extending therefrom, a roller on the arm bearing against the cam disk and adapted to ride within the cam depression, an anchor pawl pivotally mounted on the block, a toothed rotary member loosely mounted on the motor shaft and having yielding connection therewith and adapted to be engaged by the anchor pawl in one position thereof, and a signaling circuit connection closed by the rotary member in one position thereof.

6. Means for selective signaling, comprising a suitably driven motor shaft, a toothed disk loosely mounted on the motor shaft, a suitably operated escapement pawl for the toothed disk, a spring cage comprising a disk having bent arms passing through the toothed disk, a spring within the spring cage connected therewith and with the motor shaft, an insulated disk bearing against the disk of the spring cage, a contact disk bearing against the insulating disk and provided with notches in its edge, ears on the disk of the spring cage bent around the edges of the contact disk and fitting within the notches with the insulation separating it from contact with the contact disk, an arm extending from the contact disk and adapted to be engaged by the pawl, and a signaling circuit having a connection closed by such engagement of the pawl with the arm of the contact disk.

7. Means for selective signaling, comprising a motor operated disk, an anchor pawl escapement therefor, a magnet for operating the anchor pawl, a contact carried by the toothed disk adapted to engage the anchor pawl and constitute a switch, an automatic drop having a releasing magnet and a resetting magnet, said automatic drop in its engagement with the releasing magnet armature constituting a switch, an electrical circuit including said switch and the winding of the releasing magnet and the switch formed by the engaged contact and the anchor pawl, a cam having connection with the toothed disk, a cam switch having its contacts closed by said cam in the normal position of the parts, a set of telephone instruments, a circuit including the set of telephone instruments and said cam switch, a pair of contacts adapted to be engaged by the automatic drop when it is released, one of said contacts having connection with the last named circuit for short circuiting the cam switch, a bell circuit closed by the engagement of the automatic drop with the other contact, a switch tongue in the path of the cam having one contact normally engaged thereby and another contact engaged thereby when it is moved by the cam out of engagement with the first mentioned contact, an electrical circuit including the pawl operating magnet and the switch tongue with its normally engaged contact, and a circuit including the resetting magnet of the automatic drop and the switch tongue with its other contact introduced into the pawl operating magnet circuit when the cam engages the switch tongue.

In testimony whereof, I affix my signature, in presence of two witnesses.

IRA F. MANNY.

Witnesses:
   R. S. C. CALDWELL,
   KATHERINE HOLT.